(12) United States Patent
Schmalenberg (10) Patent No.: US 11,448,759 B2
(45) Date of Patent: Sep. 20, 2022

(54) SYSTEMS AND METHODS FOR INSTANTANEOUS SCANNING BY A LIDAR SENSOR AT MULTIPLE WAVELENGTHS (71) Applicant: Toyota Motor Engineering & Manufacturing North America, Inc., Plano, TX (US)

(72) Inventor: Paul Donald Schmalenberg, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 592 days.

(21) Appl. No.: 16/266,383

(22) Filed: Feb. 4, 2019

(65) Prior Publication Data
US 2020/0249350 A1 Aug. 6, 2020

(51) Int. Cl.
G01C 3/08 (2006.01)
G01S 17/34 (2020.01)
G01S 7/4911 (2020.01)
G01S 7/481 (2006.01)
G02B 6/293 (2006.01)
G01S 7/4912 (2020.01)
H04J 14/02 (2006.01)

(52) U.S. Cl.
CPC ............ *G01S 17/34* (2020.01); *G01S 7/4814* (2013.01); *G01S 7/4911* (2013.01); *G01S 7/4912* (2013.01); *G02B 6/2938* (2013.01); *H04J 14/02* (2013.01)

(58) Field of Classification Search
CPC ...... G01S 17/34; G01S 7/4814; G01S 7/4911; G01S 7/4912; G02B 6/2938; H04J 14/02
See application file for complete search history.

(56) References Cited

U.S. PATENT DOCUMENTS

| 7,920,272 | B2 | 4/2011 | Sebastian et al. | |
|---|---|---|---|---|
| 9,407,373 | B2 | 8/2016 | Fertig et al. | |
| 2002/0154372 | A1* | 10/2002 | Chung | H04J 14/0221 398/187 |
| 2011/0285980 | A1 | 11/2011 | Newbury et al. | |
| 2014/0293263 | A1 | 10/2014 | Justice et al. | |

(Continued)

FOREIGN PATENT DOCUMENTS

| CN | 110244307 A | * | 9/2019 | ............. G01S 17/06 |
|---|---|---|---|---|
| DE | 102018212982 A1 | * | 6/2020 | ........... G01S 7/4815 |

*Primary Examiner* — Mark Hellner
(74) *Attorney, Agent, or Firm* — Christopher G. Darrow; Darrow Mustafa PC (57) ABSTRACT In one embodiment, a wide-band laser beam is split into a plurality of sub-laser beams, with each sub-laser beam at a discrete wavelength. Each of the sub-laser beams is transmitted simultaneously through an antenna, with each sub-laser beam transmitted at a different angle due to properties of the antenna. Sub-laser beams that reflect off an object are received back at the same, or a different, antenna and passed to a demultiplexor. The demultiplexor passes each sub-laser to a different waveguide based on the discrete wavelength associated with each sub-laser beam. A detector receives the sub-lasers beam through the waveguides, and calculates the positions of various points on the object based in-part on which waveguide each sub-laser beam is received from and the frequency of each sub-laser beam.

19 Claims, 5 Drawing Sheets

(56) References Cited

U.S. PATENT DOCUMENTS

| | | |
|---|---|---|
| 2016/0259038 A1 | 9/2016 | Retterath et al. |
| 2018/0205463 A1* | 7/2018 | Karpov .................. G02F 1/073 |
| 2018/0306925 A1* | 10/2018 | Hosseini ................ G01S 17/42 |
| 2019/0204443 A1* | 7/2019 | Yao ....................... G01S 7/4815 |
| 2020/0225332 A1* | 7/2020 | Wagner ................ G01S 7/4863 |

* cited by examiner

SYSTEMS AND METHODS FOR INSTANTANEOUS SCANNING BY A LIDAR SENSOR AT MULTIPLE WAVELENGTHS

TECHNICAL FIELD

The subject matter described herein relates, in general, to systems and methods for instantaneously scanning multiple points of an object using a LIDAR sensor, and, in particular, to splitting a wide-band laser beam into a plurality of sub-laser beams having a range of discrete wavelengths, and instantaneously scanning the multiple points of the object using the plurality of sub-laser beams.

BACKGROUND

A LiDAR sensor is a type of sensor that is typically used to determine distances between the sensor and one or more objects. LiDAR sensors are commonly used on autonomous vehicles to provide services such as object detection and collision avoidance. Silicon photonic optical phased array is a type of LiDAR sensor that is implemented on a single CMOS chip. These types of LiDAR sensors are inexpensive, efficient, and their small size allows for a variety of placement options on vehicles.

While these LiDAR sensors are popular, there are drawbacks associated with their small size. Specifically, these sensors lack the ability to easily scan multiple points or locations at a time. Typically, each LiDAR sensor includes a narrow-band tunable laser. During each scanning window, the z-direction of the laser beam can be changed using phase shifters, and the x-direction of the laser beam can be changed by tuning the frequency of the laser. However, due to the small square radian volume of the laser beam, there may not be enough time in the scanning window to scan all of the desired points of an object.

SUMMARY

In one embodiment, a wide-band laser beam is split into a plurality of sub-laser beams, with each sub-laser beam at a discrete wavelength. Each of the sub-laser beams is transmitted simultaneously through an antenna, with each sub-laser beam transmitted at a different angle due to properties of the antenna. Sub-laser beams that reflect off an object are received back at the same, or a different, antenna and passed to a demultiplexor. The demultiplexor passes each sub-laser to a different waveguide based on the discrete wavelength associated with each sub-laser beam. A detector receives the sub-laser beams through the waveguides, and calculates the positions of various points on the object based in-part on which waveguide each sub-laser beam is received from and the frequency of each sub-laser beam.

In one embodiment, a system for instantaneous scanning by a LiDAR sensor at multiple wavelengths is provided. The system includes: a comb generator module that: receives a laser beam, wherein the laser beam is associated with a band of wavelength; and divides the laser beam into a plurality of discrete wavelengths, wherein each discrete wavelength is a sub-band of the band associated with the laser beam; a first antennae module that: receives the laser beam divided into the plurality of discrete wavelengths; and for each wavelength of the plurality of discrete wavelengths, transmits a sub-laser beam of the received laser beam, wherein each sub-laser beam is associated with a different discrete wavelength of the plurality of discrete wavelengths.

In one embodiment, a method for instantaneous scanning by a LiDAR sensor at multiple wavelengths is provided. The method includes: receiving a laser beam, wherein the laser beam is associated with a band of wavelength; dividing the laser beam into a plurality of discrete wavelengths, wherein each discrete wavelength is a sub-band of the band associated with the laser beam; for each wavelength of the plurality of discrete wavelengths, transmitting a sub-laser beam of the received laser beam, wherein each sub-laser beam is associated with a different discrete wavelength of the plurality of discrete wavelengths.

In one embodiment, a system for instantaneous scanning by a LiDAR sensor at multiple wavelengths is provided. The system includes: a comb generator module that: receives a laser beam, wherein the laser beam is associated with a band of wavelength; and divides the laser beam into a plurality of discrete wavelengths, wherein each discrete wavelength is a sub-band of the band associated with the laser beam; a first antennae module that: receives the laser beam divided into the plurality of discrete wavelengths; and for each wavelength of the plurality of discrete wavelengths, transmits a sub-laser beam of the received laser beam, wherein each sub-laser beam is associated with a different discrete wavelength of the plurality of discrete wavelengths; a second antennae module that: receives some or all of the sub-laser beams, wherein the some or all of the sub-laser beams were reflected off an object; a demultiplexing module that: for each of the some or all of the sub-laser beams, provides the sub-laser beam to a waveguide of a plurality of wave guides based on the discrete wavelength associated with the sub-laser beam; and a detector module that: receives the some or all of the sub-laser beams, wherein each sub-laser beam is received from a different waveguide of the plurality of waveguides; and based at least in part on the waveguides that each of the some or all of the sub-lasers are received from, determines the positions of a plurality of points of the object.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with simultaneously determining the positions of multiple points using LiDAR sensors are disclosed. Vehicles such as the autonomous vehicle 100 of FIG. 1 may use CMOS chip-based LiDAR sensors to perform various operations such as object detection and range finding. However, as described above, the CMOS LiDAR chips typically use narrow-beam lasers which may limit the number of positions on an object during a scanning window.

Figure 2:
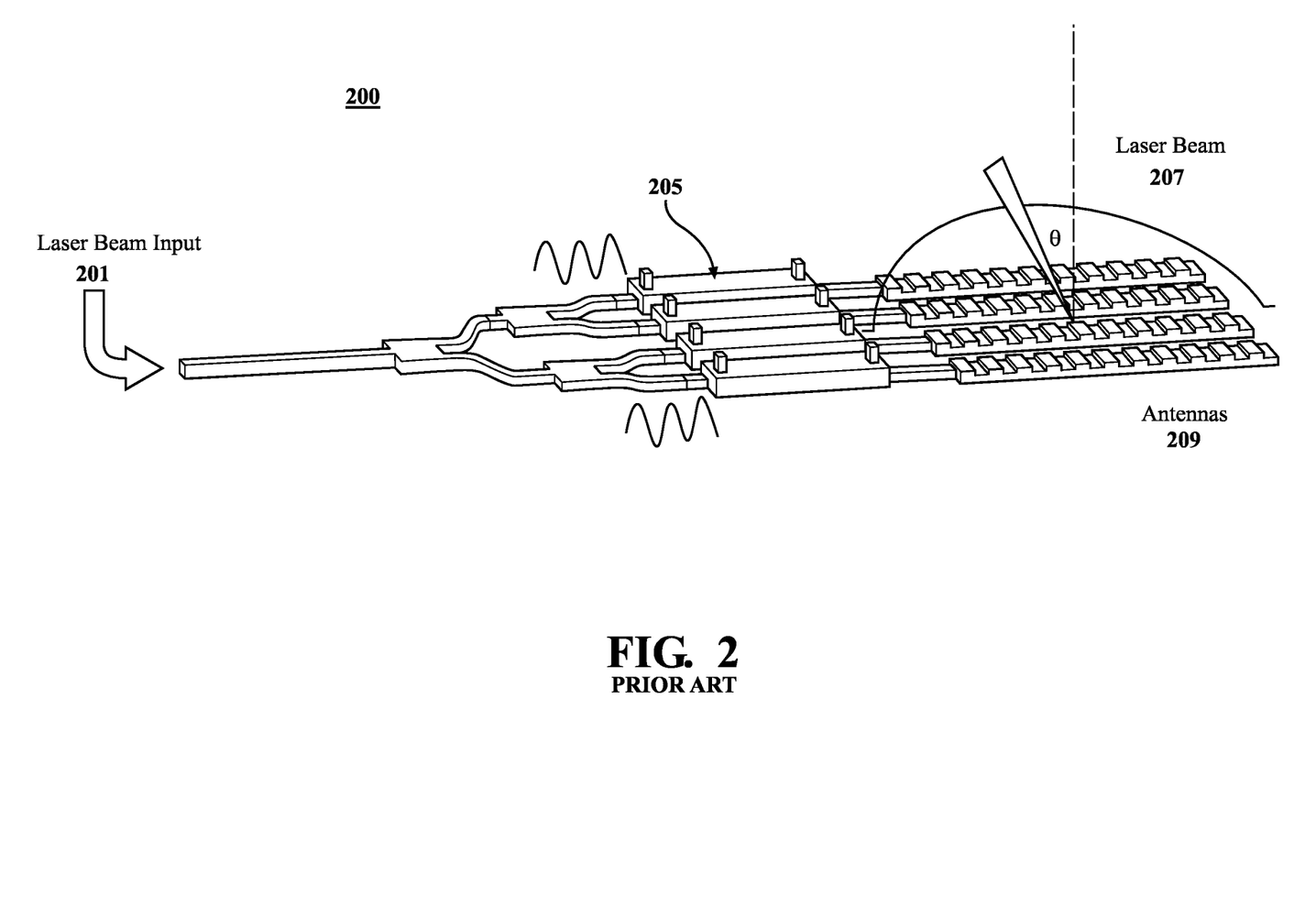
FIG. 2 illustrates a prior art LiDAR sensor system.

FIG. 2 is an illustration of a CMOS LiDAR sensor 200. The sensor 200 receives laser beam input 201. Phase shifters 205 receive the laser beam input 201 and send the laser beam input 201 to the antennas 209. The antennas 209 transmit the laser beam input 201 as the laser beam 207. Depending on the embodiment, the laser beam input 201 is provided by a laser that is part of the same CMOS chip as the LiDAR sensor 200, or may be provided by a laser that is external to the LiDAR sensor 200. The laser beam input 201 may be a narrow-band laser beam.

The phase shifters 205 may adjust the z-direction that the laser beam 207 exits the antennas 209 by changing the phase of the laser beam input 201. The CMOS LiDAR sensor 200 may adjust the x-direction that the laser beam 207 exits the antennas 209 by changing the frequency of the laser beam input 201. The CMOS LiDAR sensor 200 may determine the positions of one or more points of an object using frequency-modulated continuous-wave ("FMCW") range finding.

As described above, one drawback associated with the CMOS LiDAR sensors 200 shown above is that the laser beam 207 has a small volume due to the size of the CMOS LiDAR sensor 200 making it difficult to scan multiple points of an object during a scanning window. Moreover, unlike larger more traditional LiDAR sensors that have multiple lasers scanning at different angles during the scanning window, CMOS LiDAR sensors 200 only have one laser beam 207 scanning in the scanning window.

Returning to FIG. 1, the vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Figure 1:
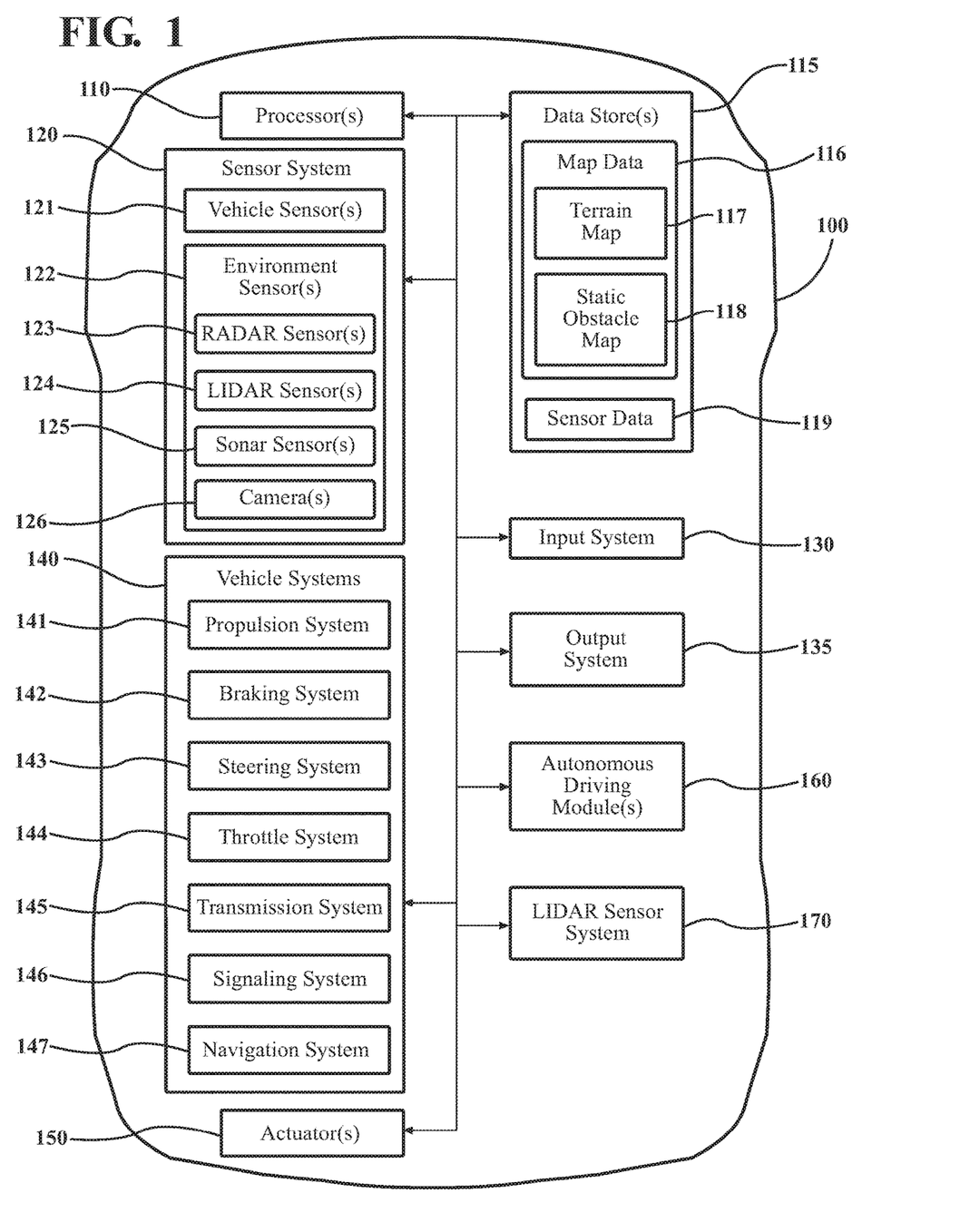
FIG. 1 illustrates an example autonomous vehicle.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a LiDAR sensor system 170 that is implemented to perform methods and other functions as disclosed herein relating to instantaneous scanning at multiple wavelengths by a LiDAR sensor. The noted functions and methods will become more apparent with a further discussion of the figures. Note the LiDAR system 170 described herein may supplement or replace the LiDAR sensors 124 described later with respect to FIG. 1.

Figure 3:
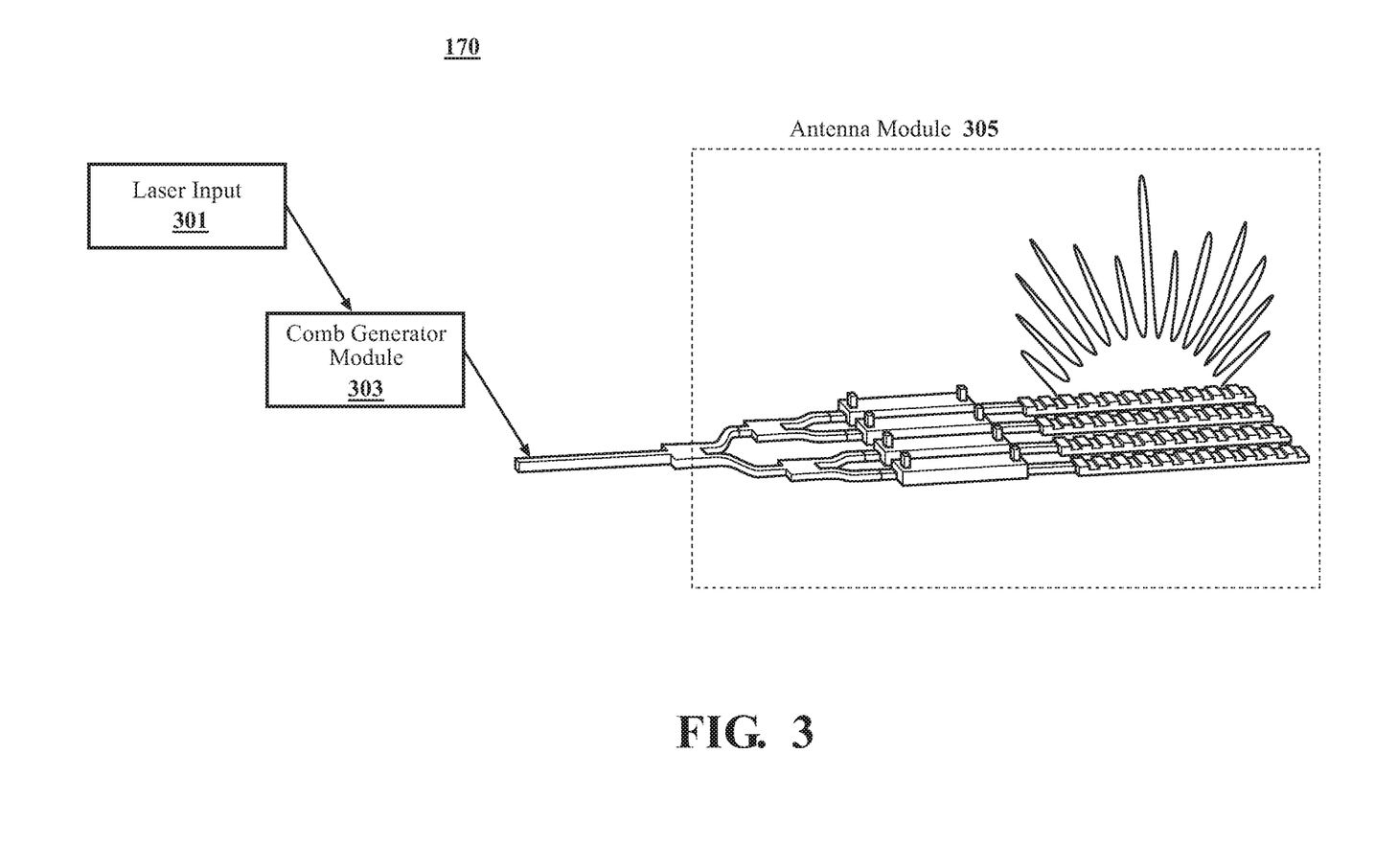
FIG. 3 illustrates an embodiment of a transmitter for a LiDAR sensor system.

With reference to FIG. 3, one embodiment of the LiDAR sensor system 170 of FIG. 1 is further illustrated. In particular, FIG. 3 is an illustration of a transmitting portion of the LiDAR sensor system 170. As illustrated, the sensor system 170 includes several components or modules such as a laser input 301, a comb generator module 303, and an antennae module 305. More or fewer modules may be supported by the LiDAR sensor system 170.

Depending on the embodiment, the LiDAR sensor system 170 may be implemented using a single CMOS chip. However, the laser input 301 may be external to the CMOS chip. Other implementations may be supported. The LiDAR sensor system 170 may provide output to one or more autonomous vehicle systems of the vehicle 100.

The laser input 301 may be provided by a wide-band laser beam. In one embodiment, the laser input 301 may be a laser beam with a range of wavelengths $\lambda_1$ $\lambda_2$ of between 1480 nm and 1620 nm. Other wavelength ranges may be used.

Figure 4:
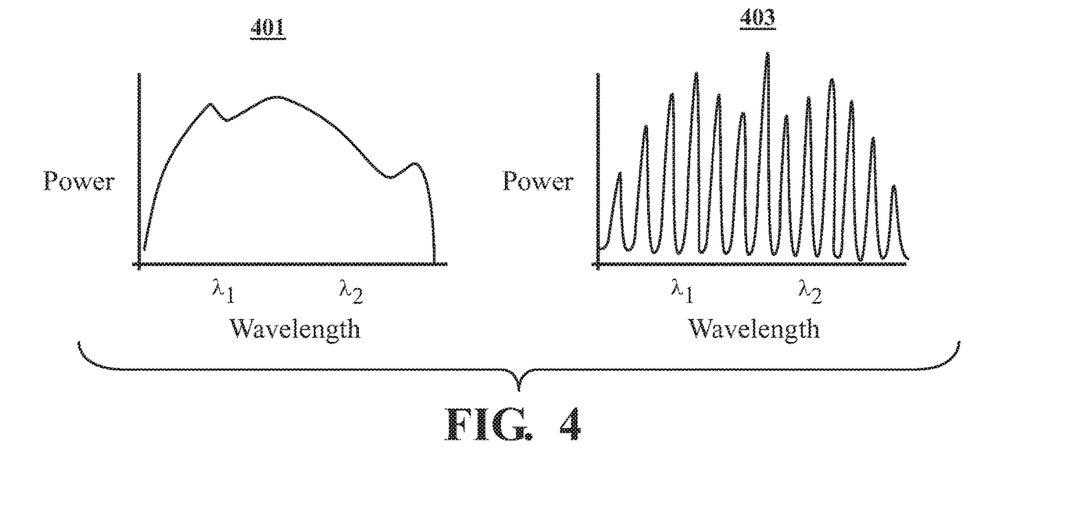
FIG. 4 illustrates example wavelengths of laser beams used in a LiDAR sensor system.

The comb generator module 303 may receive the laser input 301, and may filter and "channelize" the laser input 301 to divide the laser input 301 into a plurality of peaks. Each peak may be associated with a discrete wavelength of a plurality of discrete wavelengths across the range of the laser input 301. For example, FIG. 4 shows a graph 401 of power vs. wavelengths for the laser input 301. FIG. 4 further shows a graph 403 of power vs. wavelength for the laser input 301 after having passed through the comb generator 303. As can be seen the graph 403 includes various peaks around different discrete wavelengths. The particular discrete wavelengths may be selected by a user or administrator or may be based on properties of the antenna module 305.

Returning to FIG. 3, the comb generator module 303 dividing the laser input 301 into the plurality discrete ranges ensures that the LIDAR sensor system 170 will still work for FMCW range finding. To use FMCW range finding, it is important that the peaks corresponding to the discrete wavelengths are tunable by the comb generator module 303. The comb generator module 303 may be implemented by a tunable ring resonator or a multitude of ring resonators. Depending on the embodiment, the discrete wavelengths corresponding to the peaks should be created to be as close as possible without degrading the FMCW technique. This ensures that the resulting laser beams are reflected back from most points in a scan region of the system 170.

The comb generator module 303 may provide the laser input 301 divided into the discrete wavelengths to what is referred to herein as the antennae module 305. The antennae module 305 illustrated in FIG. 3 may function similar to the phase shifters 205 and the antennas 209 of the LiDAR system 200 described with respect to FIG. 2. The LiDAR system 170 may be on the same or a different chip as the antennae module 305.

Upon receipt of the laser input 301 divided into the discrete wavelengths, the antennae module 305 may transmit a plurality of sub-lasers, with each sub-laser corresponding to a different discrete wavelength. The geometry of the antennae module 305 causes each sub-laser to be transmitted with a different scan angle based on the discrete wavelength associated with the sub-laser. The sub-lasers may be simultaneously transmitted by the antennae module 305 into a scan region of the LiDAR sensor system 170.

Figure 5:
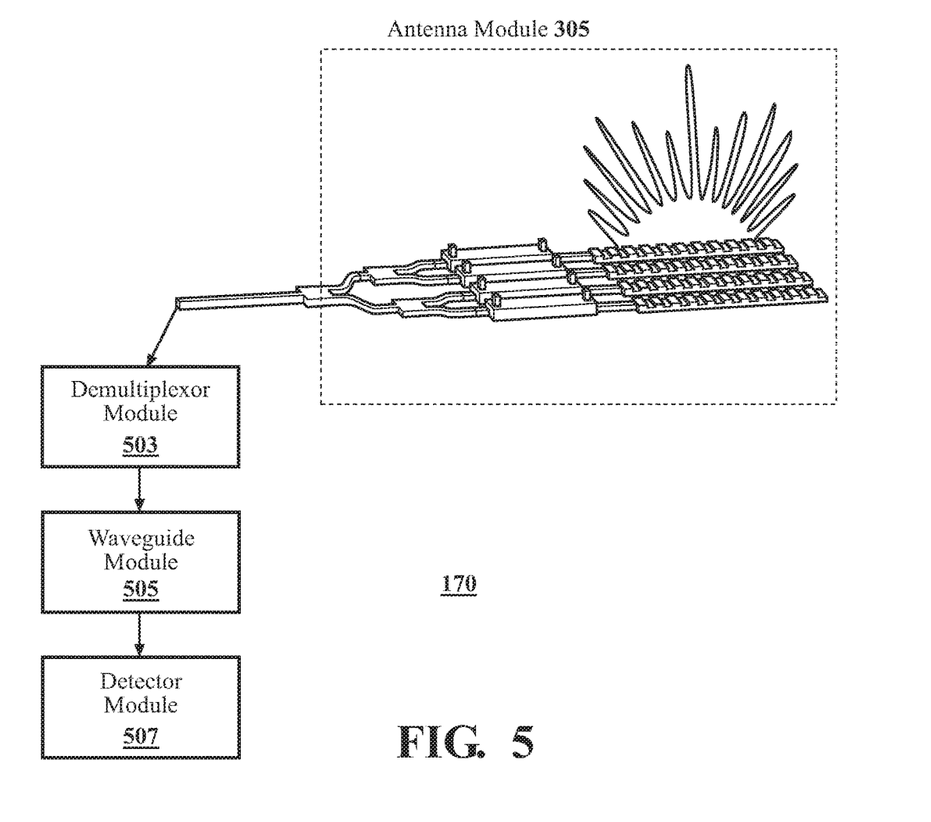
FIG. 5 illustrates an embodiment of a receiver for a LiDAR sensor system.

With reference to FIG. 5, one embodiment of the LiDAR sensor system 170 of FIG. 1 is further illustrated. In particular, FIG. 5 is an illustration of a receiving portion of the LiDAR sensor system 170. As illustrated, the sensor system 170 includes several components or modules such as an antennae module 305, a demultiplexor module 503, a waveguide module 505, and a detector module 507. More or fewer modules may be supported by the LiDAR sensor system 170.

The antennae module 305 may receive some or all of the sub-lasers after having been reflected off of one or more points on an object within the scan range of the LiDAR sensor 170. The reflected sub-lasers may be the same sub-lasers that were transmitted in FIG. 3. Depending on the embodiment, the antennae module 305 may be the same antennae module 305 as shown in FIG. 3. Alternatively, the antennae module 305 may be different. Some or all of the various modules shown in FIG. 3 and FIG. 5 may be implemented together on a same CMOS chip.

The demultiplexor module 503 may receive the various sub-laser beams as output from the antennae module 305. The demultiplexor module 503 may receive the sub-lasers coupled into a single reflected laser beam from the antennae module 305 and may split the reflected laser beam into the various discrete wavelengths associated with the sub-lasers. The demultiplexor module 503 may be a grating etalon. Other types of demultiplexors may be used.

The demultiplexor module 503 may send each sub-laser to the waveguide module 505. The waveguide module 505 may be an array of waveguides, with each waveguide corresponding to a different discrete wavelength. Any type of waveguide may be used.

The waveguide module 505 may interface with the detector module 507. In particular, the detector module 507 may include an array of detectors with individual detectors coupled to the output of each of the waveguides of the array of waveguides that comprises the waveguide module 505. Each detector may correspond to the same discrete wavelength as its associated waveguide.

The detector module 507 may determine the position of one or more points on the object (i.e., the object that reflected the sub-lasers). Because each sub-laser was transmitted and received at a known scan angle by the antennae module 305, the direction of each sub-laser is known instantaneously by the detector module 507 based on the particular detector that receives the sub-laser. Based on the directions and the particular frequencies of the received sub-lasers, the detector module 507 may then determine the positions of one or more points on the object. The positions may be provided to the vehicle 100 for the performance of various functions such as object detection and collision avoidance, for example.

When the various sub-laser beams are demultiplexed and sent to the array of waveguides of the waveguide module 505, each wavelength may not be perfectly separated, and cross-coupling of energies may occur between spatially near waveguides. The detector module 507 may have multiple detectors, and the detected signal power may be placed into vector r where the elements of the vector $(r_1 \ldots r_n)$ correspond to each individual detector. The characteristics of the waveguide array and detectors versus wavelength may be measured beforehand and placed in matrix B, with one row of B corresponding to the characteristics of one waveguide/detector pair and one column corresponding to a wavelength whose power is to be estimated. Vector x corresponds to the actual power of each sub-beam, and each element of x is a single sub-beam wavelength which is to be determined. Vector x may be estimated by solving directly or estimating the inverse problem $x=B^{-1}r$. Once x is known, the power in each sub-beam is also known, and therefore the power returned in each sub-beam. In this way the power is instantaneously estimated in more unique wavelengths than number of detectors in the detector module 507.

Figure 6:
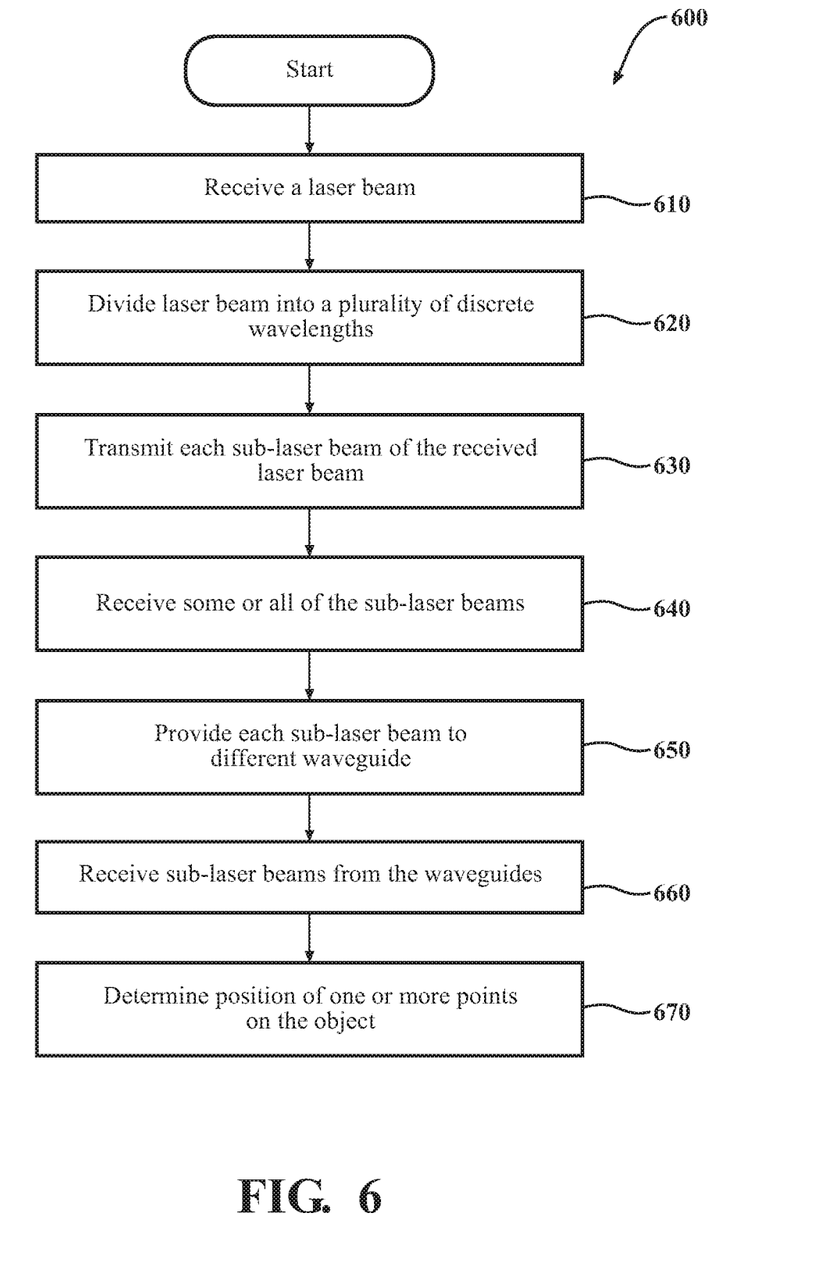
FIG. 6 illustrates a flowchart of a method that is associated with simultaneously determining the positions of multiple points on an object using a LiDAR sensor.

Additional aspects of instantaneously scanning by a LiDAR sensor at multiple wavelengths will be discussed in relation to FIG. 6. FIG. 6 illustrates a flowchart of a method 600 that is associated with determining the positions of one or more points on an object simultaneously. The method 600 will be discussed from the perspective of the LiDAR sensor system 170 of FIGS. 3 and 5. While the method 600 is discussed in combination with the LiDAR sensor system 170, it should be appreciated that the method 600 is not limited to being implemented within the LiDAR sensor system 170, but the LiDAR sensor system 170 is instead one example of a system that may implement the method 600.

At 610, the comb generator module 303 receives a laser beam. The laser beam may be the laser input 301 and may be a wide-band laser beam. The laser beam may have a wavelength range of approximately 1480 nm to 1620 nm. Other ranges may be supported. The comb generator module 303 may receive the laser beam from a laser that is part of the same chip as the comb generator module 303 (or the LiDAR sensor system 170), or from a laser that is outside of the chip.

At 620, the comb generator module 303 divides the laser beam into a plurality of discrete wavelengths. Depending on the embodiment, the comb generator module 303 may be tunable and may be a tunable ring resonator or multiple ring resonators.

At 630, the antenna module 305 transmits each sub-laser beam of the received laser beam. The antenna module 305 may transmit a sub-laser beam corresponding to some or all of the discrete wavelengths of the plurality of discrete wavelengths. Each sub-laser beam may be transmitted into the scan region of the LiDAR sensor 170 at an object that is being scanned. Each sub-laser beam may be transmitted from the antenna module 305 at an angle that is determined by the discrete wavelength associated with the sub-laser beam.

At 640, the antenna module 305 receives some or all of the sub-laser beams. The antenna module 305 may receive the some or all of the sub-laser beams that reflect off of points of the object in the scan region of the LiDAR sensor 170. The antenna module 305 that receives the some or all of the sub-laser beams may be the same or different than the antenna module 305 that transmitted the sub-laser beams at 630.

At 650, the demultiplexor module 503 provides each sub-laser beam to a different waveguide of the waveguide module 505. The demultiplexor 503 may receive from the antenna module 305 a reflected laser beam that includes all of the discrete wavelengths associated with the some or all of the sub-laser beams that were received at 640. The demultiplexor module 503 may be a grating etalon or another type of demultiplexor. The demultiplexor module 503 may provide each sub-laser beam to the waveguide corresponding to the associated discrete wavelength.

At 660, the detector module 507 receives sub-laser beams from each waveguide. The detector module 507 may include a detector for each waveguide of the waveguide module 505. Each detector may receive a sub-laser beam from its respective waveguide. Depending on the embodiment, there may be fewer detectors and waveguides than discrete wavelengths.

At 670, the detector module 507 determines positions of one or more points on the object. The detector module 507 may determine the positions of the one or more points on the object by, for each detector of the detector module 507, determining the position of a point of the one or more points based on the frequency of sub-laser received by the detector and the angle at which the sub-laser was received by the antennae module 305. As described above, each sub-laser was transmitted and received at an angle that is known from the discrete wavelength associated with the sub-laser. Accordingly, the angle at which the sub-laser was received by the antennae is known for each detector allowing for the positions to be determined simultaneously for the one or more points. The positions may be provided to the vehicle 100 for use in one or more autonomous vehicle functions such as object avoidance and navigation.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the LiDAR sensor system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the LiDAR sensor system 170, and/or the autonomous driving module(s) 160 may control some or all of these vehicle systems 140 and, thus, may be partially or fully autonomous.

The processor(s) 110, the LiDAR sensor system 170, and/or the autonomous driving module(s) 160 can be operatively connected to communicate with the various vehicle systems 140 and/or individual components thereof. For example, returning to FIG. 1, the processor(s) 110, the LiDAR sensor system 170, and/or the autonomous driving module(s) 160 can be in communication to send and/or receive information from the various vehicle systems 140 to control the movement, speed, maneuvering, heading, direction, etc. of the vehicle 100. The processor(s) 110, the LiDAR sensor system 170, and/or the autonomous driving module(s) 160 may control some or all of these vehicle systems 140.

The processor(s) 110, the LiDAR sensor system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the LiDAR sensor system 170, and/or the autonomous driving module(s) 160 can control the direction and/or speed of the vehicle 100. The processor(s) 110, the LiDAR sensor system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the LiDAR sensor system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

What is claimed is:

1. A method for instantaneous scanning by a LiDAR sensor at multiple wavelengths, the method comprising:
   receiving a laser beam, wherein the laser beam is associated with a wavelength band;
   dividing the laser beam into a plurality of discrete wavelengths, wherein each discrete wavelength is a sub-band of the wavelength band associated with the laser beam;
   for each wavelength of the plurality of discrete wavelengths, transmitting a sub-laser beam of the laser beam, wherein each sub-laser beam is associated with a different discrete wavelength of the plurality of discrete wavelengths;
   receiving some or all of the sub-laser beams, wherein the some or all of the sub-laser beams were reflected off an object;
   providing each sub-laser beam, of the some or all of the sub-laser beams, to a different waveguide of a plurality of waveguides, wherein each waveguide corresponds to a different discrete wavelength of a plurality of discrete wavelengths reflected off the object;
   receiving, via the plurality of waveguides, the some or all of the sub-laser beams, wherein each discrete wavelength is associated with a corresponding detector of an array of detectors;
   for the each discrete wavelength, calculating, using the array of detectors, an estimate of an actual power of a corresponding sub-laser beam, the estimate incorporating an adjustment of a detected power of the corresponding sub-laser beam, the adjustment associated with at least one characteristic of at least one pair of a waveguide and a corresponding detector, the at least one characteristic associated with a difference between the detected power and the actual power, wherein the estimate of the actual power of the corresponding sub-laser beam is an element of a first vector, the first vector representing estimates of the actual power for the some or all of the sub-laser beams, the detected power of the corresponding sub-laser beam is an element of a second vector, the second vector representing the detected power for the some or all of the sub-laser beams, and the array of detectors calculates the estimate by multiplying the second vector by a matrix, the matrix having, for each pair of the waveguide and the corresponding detector, at least one value associated with the at least one characteristic associated with the difference between the detected power and the actual power; and
   determining, based on estimates of the actual power of the some or all of the sub-laser beams, positions of a plurality of points on the object.

2. A system for instantaneous scanning by a LiDAR sensor at multiple wavelengths, the system comprising:
   a comb generator configured to:
      receive a laser beam, wherein the laser beam is associated with a wavelength band; and
      divide the laser beam into a plurality of discrete wavelengths, wherein each discrete wavelength is a sub-band of the wavelength band associated with the laser beam;

a first antennae configured to:
  receive the laser beam divided into the plurality of discrete wavelengths; and
  for each wavelength of the plurality of discrete wavelengths, transmit a sub-laser beam of the laser beam, wherein each sub-laser beam is associated with a different discrete wavelength of the plurality of discrete wavelengths;
a second antennae configured to receive some or all of the sub-laser beams, wherein the some or all of the sub-laser beams were reflected off an object;
a demultiplexer configured to provide each sub-laser beam, of the some or all of the sub-laser beams, to a corresponding waveguide of a plurality of waveguides, wherein each waveguide is for a corresponding discrete wavelength of a plurality of discrete wavelengths reflected off the object; and
an array of detectors configured to:
  receive, via the plurality of waveguides, the some or all of the sub-laser beams, wherein each discrete wavelength is associated with a corresponding detector of the array of detectors;
  for the each discrete wavelength, calculate an estimate of an actual power of a corresponding sub-laser beam, the estimate incorporating an adjustment of a detected power of the corresponding sub-laser beam, the adjustment associated with at least one characteristic of at least one pair of a waveguide and a corresponding detector, the at least one characteristic associated with a difference between the detected power and the actual power; and
  determine, based on estimates of the actual power of the some or all of the sub-laser beams, positions of a plurality of points on the object,
wherein:
  the estimate of the actual power of the corresponding sub-laser beam is an element of a first vector, the first vector representing estimates of the actual power for the some or all of the sub-laser beams,
  the detected power of the corresponding sub-laser beam is an element of a second vector, the second vector representing the detected power for the some or all of the sub-laser beams,
  the array of detectors is configured to calculate the estimate by multiplying the second vector by a matrix, the matrix having, for each pair of the waveguide and the corresponding detector, at least one value associated with the at least one characteristic associated with the difference between the detected power and the actual power.

3. A system, comprising:
waveguides configured to receive sub-laser beams reflected off an object, each of the sub-laser beams having a wavelength different from another wavelength associated with another of the sub-laser beams; and
detectors configured to:
  calculate estimates of actual power of the sub-laser beams, the estimates incorporating adjustments of detected power of the sub-laser beams, the adjustments associated with characteristics of pairs of a waveguide and a corresponding detector of the detectors, the characteristics associated with differences between the detected power and the actual power; and
  determine, based on the estimates, positions of points on the object,
wherein a count of wavelengths for which the estimates of actual power are calculated is greater than a count of the detectors.

4. The system of claim 2, wherein the first antenna is the same as the second antennae.

5. The system of claim 2, wherein the demultiplexer is a grating etalon.

6. The system of claim 2, wherein the comb generator is a ring resonator.

7. The system of claim 2, wherein the comb generator is tunable.

8. The system of claim 2, wherein the system comprises a CMOS chip.

9. The system of claim 2, wherein the wavelength band is approximately 1480 nm to 1620 nm.

10. The method of claim 1, wherein:
the transmitting the sub-laser beam comprises transmitting, from a first antenna, the sub-laser beam; and
the receiving the some or all of the sub-laser beams comprises receiving, from a second antenna, the some or all of the sub-laser beams.

11. The method of claim 1, further comprising:
receiving the some or all of the sub-laser beams, wherein each sub-laser beam is received from a different waveguide of the plurality of waveguides; and
based at least in part on the waveguides that each of the some or all of the sub-lasers are received from, determining positions of a plurality of points on the object.

12. The method of claim 1, wherein the providing the sub-laser beam to the corresponding waveguide of the plurality of waveguides is performed using a grating etalon.

13. The method of claim 1, wherein the dividing the laser beam is performed using a comb generator.

14. The method of claim 13, wherein the comb generator is a ring resonator.

15. The method of claim 13, wherein the comb generator is tunable.

16. The method of claim 1, wherein the method is implemented by a CMOS chip.

17. The method of claim 1, wherein the wavelength band is approximately 1480 nm to 1620 nm.

18. The system of claim 2, wherein the array of detectors is further configured to calculate an estimate of an actual power associated with a wavelength different from any of the plurality of discrete wavelengths.

19. The system of claim 3, wherein the detectors are further configured to calculate an estimate of an actual power associated with a wavelength different from any of the wavelengths of the sub-laser beams.

* * * * *